Feb. 22, 1955  S. W. ALDERFER  2,702,769
METHOD OF MAKING SPONGE RUBBER ARTICLES AND PRODUCT
Filed Aug. 16, 1951
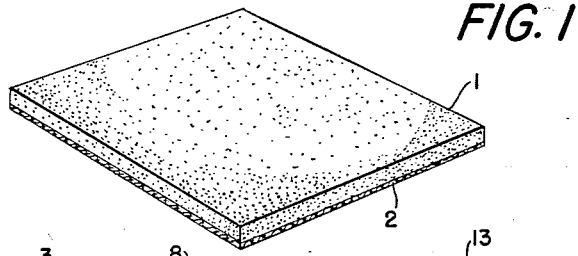
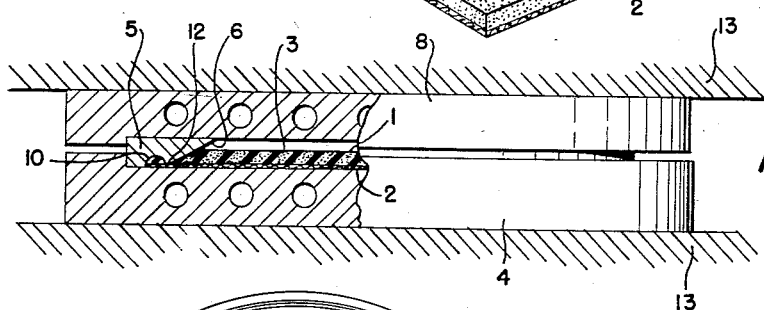
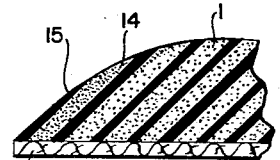
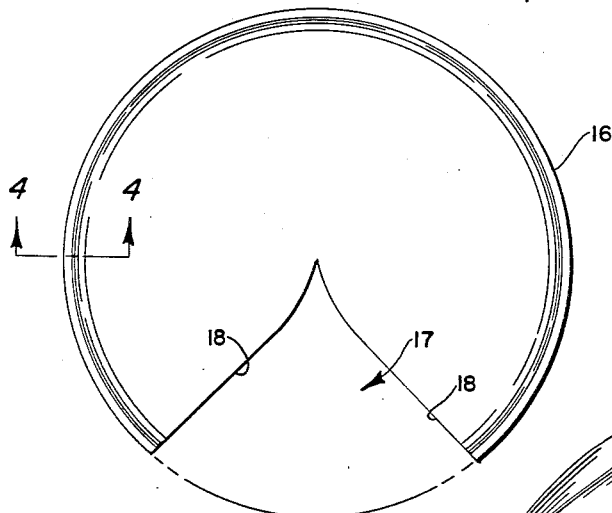
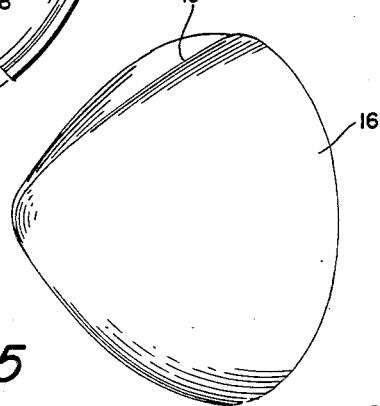
INVENTOR.
STERLING W. ALDERFER
BY
ATTORNEYS

United States Patent Office 2,702,769
Patented Feb. 22, 1955

2,702,769

METHOD OF MAKING SPONGE RUBBER ARTICLES AND PRODUCT

Sterling W. Alderfer, Akron, Ohio, assignor of three-tenths to Edward D. Andrews, Akron, Ohio Application August 16, 1951, Serial No. 242,107

6 Claims. (Cl. 154—54)

The present invention relates to method for manufacturing articles from sponge rubber in order to convert the same into articles for special purposes and to product obtained by use of the method. There is a demand for sponge rubber sheets, pads, or the like having skived or beveled edges. These beveled pads may be put to a variety of uses; however, the use for which this invention was particularly designed is in the manufacture of breast pads.

Pads for this purpose require the edges to be beveled and the only method in use prior to the present invention was to cut the edges of the pad at the required angle. Cutting of a sponge rubber sheet for any purpose gives a rough surface along the cut, which is objectionable and unsightly because of the exposed cells.

The method of the present invention consists in placing a sheet of cured sponge rubber, which preferably has a fabric backing layer, in a mold in which is located a supplemental frame or ring, the inner surface of which is beveled. Pressure is applied to the ring which forces it against the edge portion of the sponge rubber sheet and heat is applied, which will give a second cure to the sponge rubber which is in contact with the ring. Preferably, the ring is provided with a sharp edge which is forced into the sponge rubber sheet, and the heat and pressure will sever the fabric around the edge of the article so that the article may be readily trimmed to exact size when it is removed from the mold.

With the foregoing statement of the invention, the principles thereof will be understood from the drawings and the following description, it being understood, however, that while the details of the preferred apparatus and method are found herein, the invention is not limited to exact following of the details but may be modified, improved and varied within the scope of the invention as set forth in the appended claims.

In the drawings:

Fig. 1 is a view of a sheet of sponge rubber which may be used for the manufacture of the material.

Fig. 2 is a view of a mold such as used in carrying out the process, a part of the mold being broken away to show the internal construction.

Fig. 3 is a plan view of a circular pad such as used in the manufacture of a breast pad.

Fig. 4 is an enlarged cross section of the edge portion of a pad such as made by the use of the mold shown in Fig. 2.

Fig. 5 is a perspective view of a complete breast pad.

The material which is used in the process may be a sheet of cured sponge rubber of any type. However, it is preferred to use a sheet of sponge rubber and fabric laminated together and made by the process of applicant's co-pending application Serial No. 156,203, filed April 15, 1950, now Patent No. 2,628,654. Material made by the said process is preferred because the sponge rubber layer 1 is permanently secured to the fabric backing 2 during the setting and vulcanizing of the sponge rubber and because the upper surface of the sponge rubber is smooth and unbroken by the presence of any pores which are visible to the naked eye. Sponge rubber sheets made by cutting the thicker sheets of sponge rubber have a multiplicity of large exposed pores, whereas the surface of the sponge rubber in the preferred type of sheeting is soft and smooth and very similar in appearance and texture to the best grade of chamois.

In the specific example shown and described herein, a circular pad is manufactured but pads of any shape may be made by the process. From the sheet shown in Fig. 1 there is cut a circular pad slightly larger than the finished pad. A pad is shown in the mold and is given the reference numeral 3. The pad 3 is placed in the lower half 4 of a mold and on the surface of the pad is placed the frame here shown as a ring 5.

The ring 5 is provided with an inner beveled surface 6, usually with an inclination greater than 45°. The ring is somewhat thicker than the depth of the pad 3 so that the main body of the pad 3 does not come in contact with the upper mold section 8. In the form of the invention illustrated, ring 5 is provided with a circumferential groove 10 about the ring, the groove being cut so that a sharp edge 12 is left at the base of the bevel 6. The mold and ring assembly is then placed in a press, the upper and lower platens of which are indicated at 13, which forces the two mold sections together against the ring 5, and heat is applied of a degree sufficient and for a period to give a short supplemental cure to the pad. The degree of heat and the duration of this supplemental cure is variable, depending upon the results desired. Usually the second or supplemental cure is only for the purpose of giving a set-cure to the edge of the sheet. Any rubber technician can determine these factors. The mold sections 4 and 8 may be chambered for the circulation of steam or the platens may be heated.

The results of the procedure described are to form and set the edges of the pad in a smooth beveled surface 15, which is wholly devoid of any pores or roughness such as is found whenever a sponge rubber sheet is cut. Also, the sponge rubber in the region 14, where the ring 5 exerts pressure, is compacted to the extent that the cells are either eliminated altogether or are greatly reduced in volume. This gives a beveled edge which is still soft and yielding, but of greater strength than the body of the sponge rubber, so that it does not tend to fray out, tear or chip when in use. Ordinary sponge rubber has little inherent strength and is easily torn on its exposed edges, whereas the pad made by this process is not subject to disintegration along its edge.

When the sharp rib 12 and groove 10 are employed, the pressure exerted while the mold is in the press will cut through the fabric, so that the outer rim of the pad is readily removed from the main portion and trimming of the pad may be dispensed with or is facilitated.

As indicated above, sponge rubber pads with compacted beveled edges may be used for chair pads, table pads, shoe inserts, and the like. In the drawings, however, the pad is shown as converted into a conical pad adapted for use as a breast pad. This is done by cutting out of a circular pad 16, made by the process, a sector 17. The edges 18 are then brought together in a seam 19 and may be cemented to form the dome-shaped pad, or a hot iron may be run over the seam, welding the edges together.

It will be seen that a valuable technical result has been obtained by the method and that the product is novel and superior to skived or beveled sponge rubber articles made by the older method.

What is claimed is:

1. The method of manufacturing articles of sponge rubber comprising placing a sheet of vulcanized sponge rubber on a support, confining the edge portion of the sheet in beveled form while leaving the remainder of the sheet unconfined, applying sufficient pressure to opposite sides of the edge portion of the sheet to compact that portion in beveled form, and applying heat to impart a supplemental cure to the beveled compacted portion of the sheet.

2. The method of manufacturing articles of sponge rubber comprising supporting the entire area of a sheet of vulcanized sponge rubber, confining the marginal portion only of the sheet in beveled form, applying sufficient pressure to opposite sides of said marginal portion while maintaining it in beveled form to compact said marginal portion, and applying heat to impart a supplemental cure to the beveled compacted portion of the sheet.

3. The method of manufacturing articles of sponge rubber comprising placing a sheet of vulcanized sponge rubber on a support, confining the edge portion of the sheet in beveled form while leaving the remainder of the sheet unconfined, and applying sufficient pressure and heat to opposite sides of the edge portion of the sheet to compact and cure that portion in beveled form.

4. The method of manufacturing articles of sponge rubber comprising supporting the entire area of a sheet of vulcanized sponge rubber, confining the marginal portion only of the sheet in beveled form, applying sufficient pressure to opposite sides of said marginal portion while maintaining it in beveled form to compact said marginal portion, applying heat to impart a supplemental cure to the beveled compacted portion, and shearing the outer edge of said marginal portion during the application of pressure thereto.

5. As a new article of manufacture, a sheet of sponge rubber vulcanized throughout its main body and having a beveled edge portion which is denser than the main body of the rubber and which is cured to a greater degree than the main body of the rubber.

6. As a new article of manufacture, a sheet of sponge rubber vulcanized throughout its main body and having a beveled edge portion which is denser than the main body of the rubber and which is cured to a greater degree than the main body of the rubber, and a sheet of fabric united with and forming a backing for the sponge rubber.

References Cited in the file of this patent

UNITED STATES PATENTS

| | | |
|---|---|---|
| 1,645,604 | Lower | Oct. 18, 1927 |
| 1,752,295 | Felix | Apr. 1, 1930 |
| 2,157,243 | Minor | May 9, 1939 |
| 2,240,581 | Seward | May 6, 1941 |
| 2,303,198 | Cunnington | Nov. 24, 1942 |